United States Patent [19]

Rice

[11] Patent Number: 5,743,487
[45] Date of Patent: Apr. 28, 1998

[54] AIRCRAFT VIDEO MONITOR DEPLOYMENT AND RETRACTION APPARATUS

[75] Inventor: Mark X. Rice, Buena Park, Calif.

[73] Assignee: Hollingsead International, Inc., Santa Fe Springs, Calif.

[21] Appl. No.: 631,102

[22] Filed: Apr. 12, 1996

[51] Int. Cl.[6] .......................... A47B 46/00; B64D 11/00
[52] U.S. Cl. .................. 244/1 R; 244/118.5; 312/7.2; 312/245; 307/9.1; 307/119
[58] Field of Search ............................. 244/118.5, 129.1, 244/1 R; 312/242, 245, 246, 248, 7.2; 307/9.1, 119

[56] References Cited

U.S. PATENT DOCUMENTS

| 4,639,106 | 1/1987 | Gradin . | |
|---|---|---|---|
| 5,096,271 | 3/1992 | Portman . | |
| 5,145,128 | 9/1992 | Umeda . | |
| 5,181,771 | 1/1993 | Robak et al. . | |
| 5,456,529 | 10/1995 | Cheung | 312/248 X |
| 5,583,735 | 12/1996 | Pease et al. | 312/7.2 X |

Primary Examiner—William Grant
Attorney, Agent, or Firm—Harold L. Jackson

[57] ABSTRACT

A video monitor is deployed from an aircraft overhead storage compartment via a monitor-drive shaft selectively connected to an electric motor and retracted back into the compartment by a spring connected to the shaft. The monitor has limited rotational movement in both directions relative to the shaft. A bump sensor detects when the monitor has moved from its deployed position relative to the shaft as a result of being struck by a passenger and trips a solenoid. The solenoid, in turn, disengages the monitor-drive shaft from the motor and allows the spring to return the monitor to its stores position.

17 Claims, 8 Drawing Sheets

AIRCRAFT VIDEO MONITOR DEPLOYMENT AND RETRACTION APPARATUS

BACKGROUND OF THE INVENTION

1. Field of the Invention

The present invention relates to apparatus for deploying and retracting video screens or monitors and more particularly to such apparatus designed for use in the overhead storage racks of aircraft.

2. Description of the Prior Art

The commercial airlines have found it advantageous to equip their aircraft with video systems to entertain passengers with movies, news events, documentaries, etc. The wide and medium-bodied jet aircraft have sufficient room to accommodate large screens (and associated projectors) positioned above the central seating section or above the aisles. Such wide and medium-bodied jets can also accommodate video monitors in overhead compartments. At least one system has been used to deploy and retract monitors from such overhead compartments. This system, manufactured by Matsushita Avionics Co., employs an electric motor, pulleys and cables to raise and lower the monitors. While the system performs satisfactorily it is complicated, expensive to manufacture and requires considerable space, particularly in the depth dimension.

The prior art systems designed for use in aircraft overhead compartments will not fit in the compartments of narrow-bodied aircraft such as DC 9's and MD 80's which have only about three inches of depth (and about 17"×5" in length and width) available in the overhead compartments. To compound the problem of designing a system for narrow bodied aircraft, the U.S. Federal Aviation Agency ("FAA") has placed several requirements on the operation of such systems to prevent the monitor from interfering with passenger movements especially in times of emergency. First, there must be a central control over the deployment of the monitors to prevent accidental deployment. This is generally accomplished through the use of a master switch which must be activated or turned on prior to deployment. Second, the monitors must be automatically retracted upon a failure of aircraft power or a drop in cabin pressure. Third, the system must respond to a passenger bumping the monitor by automatically retracting the monitor.

A prior art video monitor deployment and retraction system which satisfies some of the above requirements is described in U.S. Pat. No. 5,096,271 ("'271 system"). The '271 system interposes a slip clutch between the shaft of an electric motor, electric brake mechanism and a drive shaft which rotates the video monitor between a stored and an exposed (viewing) position. The electric motor acting through the slip clutch rotates the monitor to the exposed position and the electric brake holds the monitor in that position.

If a blow is struck against the exposed monitor, e.g., by a passenger, in a direction to rotate the monitor back to its stored position, then the slip clutch will allow the monitor to return to its storing cavity. However, the slip clutch will not return the monitor to its stored position in response to a blow struck in the opposite direction. Thus, the '271 system only partially satisfies the above requirements. Also, the use of a separate brake and clutch renders the '271 system unduly complex and expensive.

There is a need for a simple video monitor deployment and retracting apparatus which will fit into the available space in the overhead compartments of narrow as well as wide-bodied aircraft and meet the FAA safety requirements (and safety regulations of other countries).

SUMMARY OF THE INVENTION

The video monitor or screen deployment and retraction apparatus of the present invention includes a housing adapted to be mounted in an aircraft overhead compartment. A video screen or monitor is positioned within an opening in the bottom wall of the compartment and is pivotally mounted via a drive shaft secured in the housing for rotation between a stored position in which the monitor is located within the compartment facing the opening and a deployed position for viewing by passengers.

A first coupling mechanism connects the monitor to the monitor drive shaft to cause the monitor to rotate with the shaft while allowing limited rotational movement of the monitor in either direction relative to the shaft in response to an external force applied to the monitor. An electric motor is coupled to the drive shaft via a second coupling mechanism which, when enabled, allows the motor to rotate the monitor-drive shaft and the monitor to the deployed position. A first position sensor senses when the monitor is in the deployed position to deenergize the motor. A spring is coupled to the monitor drive shaft to return the monitor to the stored position when the second coupling mechanism is disabled. A second position sensor senses when the monitor has moved relative to the drive shaft in response to an external force such as being bumped by a passenger and disables the second coupling mechanism to allow the spring to return the monitor to its stored position.

The structure, operation and features of the present invention may best be understood by reference to the following description of the preferred embodiment taken in conjunction with the drawings in which the same components in the several figures bear the same reference numerals.

DESCRIPTION OF THE PREFERRED EMBODIMENT

Figure 1:
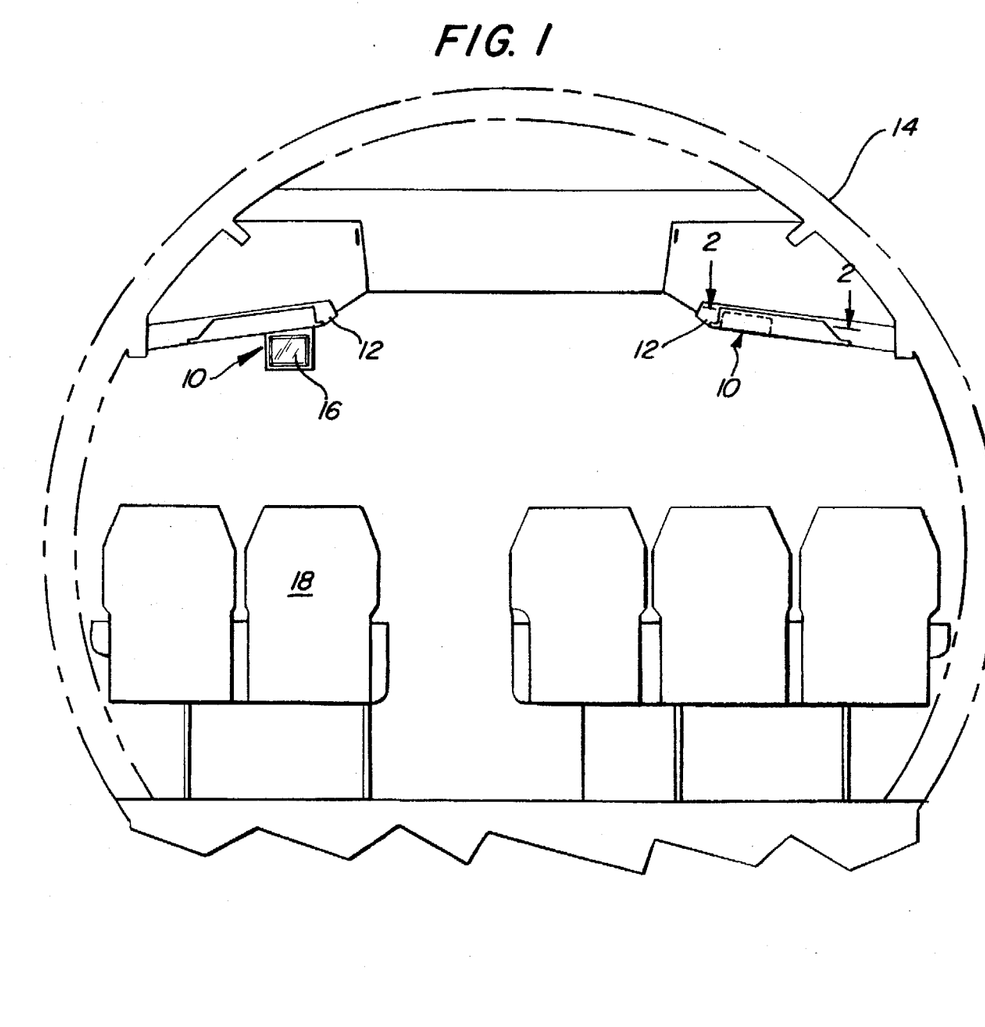
FIG. 1 is an illustrative view of the present invention installed in the overhead compartment of an aircraft showing one monitor in its deployed position for viewing by passengers (left side) and one monitor in its stored position (right side)

Referring now to the drawings and particularly to FIG. 1, a video screen or monitor deployment and retraction apparatus 10 in accordance with the present invention is adapted to be mounted in an overhead compartment 12 of an aircraft 14. In the deployed position, as shown on the left hand side of FIG. 1, the monitor or screen 16 is in the deployed position for viewing by passengers seated, for example, in seats 18. In the retracted position, the monitor is retracted into the compartment 12 as is illustrated on the right hand side of FIG. 1.

Figure 2:
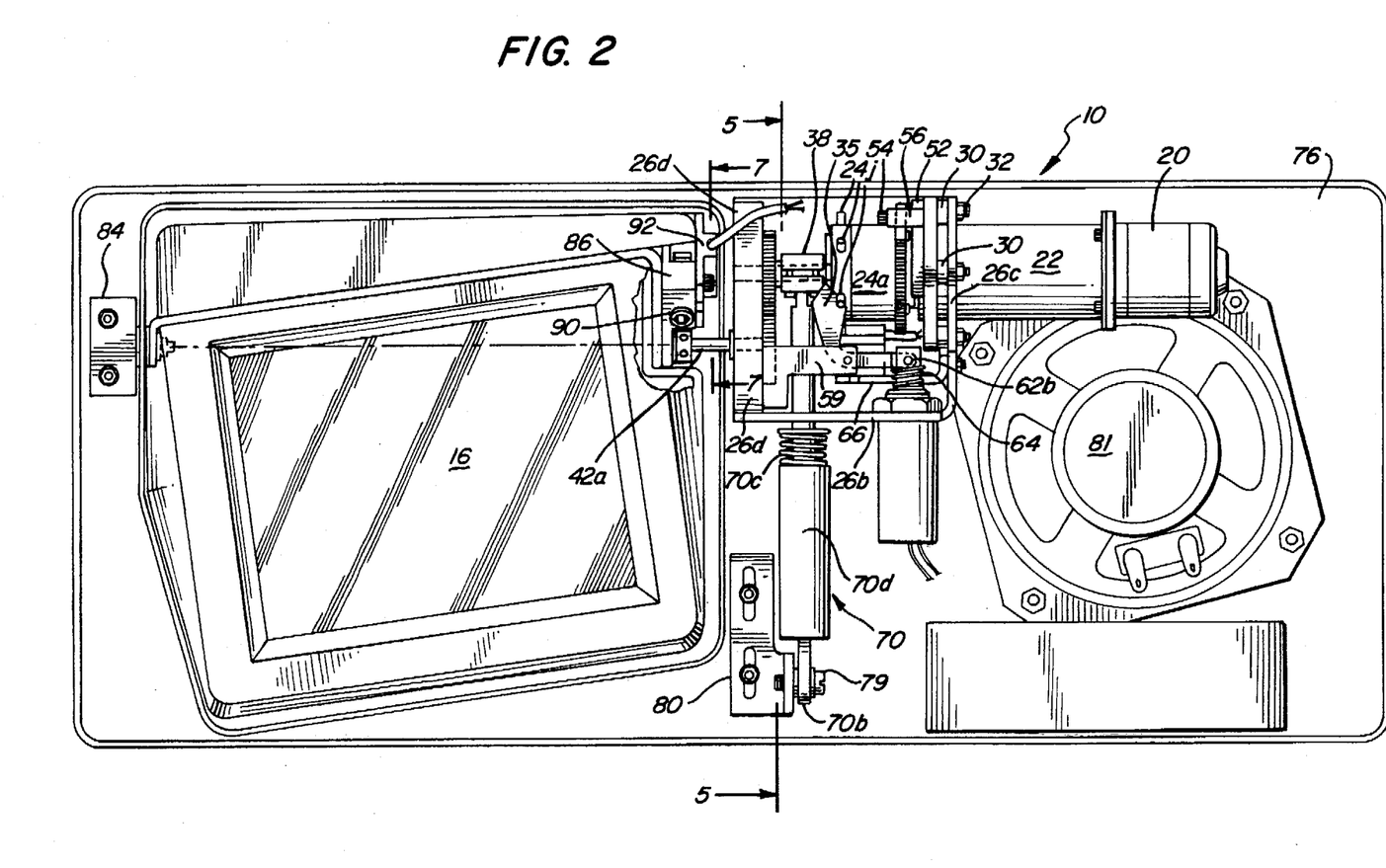
FIG. 2 is a top plan view of the invention as mounted within an overhead compartment including a speaker.
Figure 3:
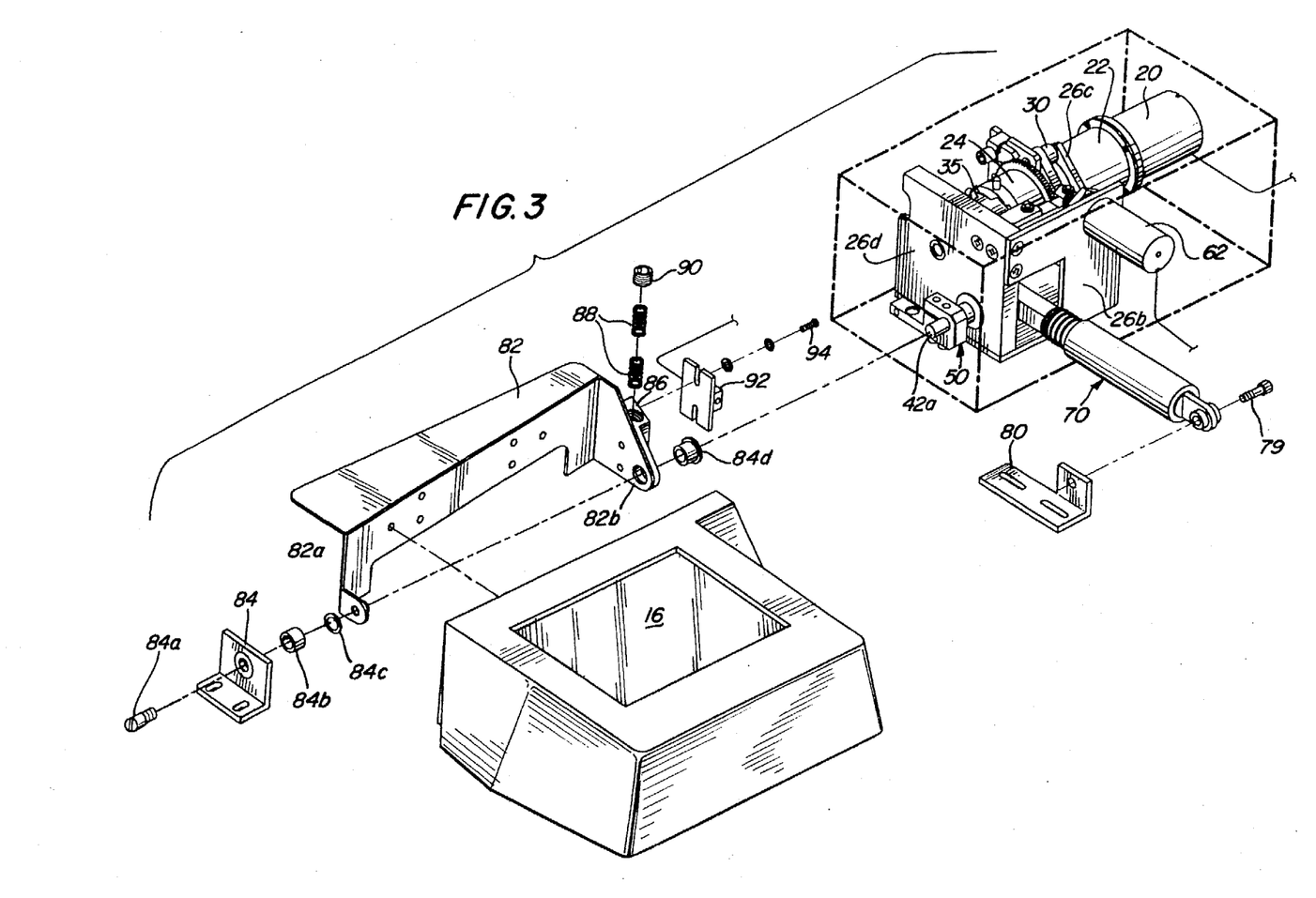
FIG. 3 is a partially exploded perspective view of the apparatus of FIG. 2 minus the housing.
Figure 4:
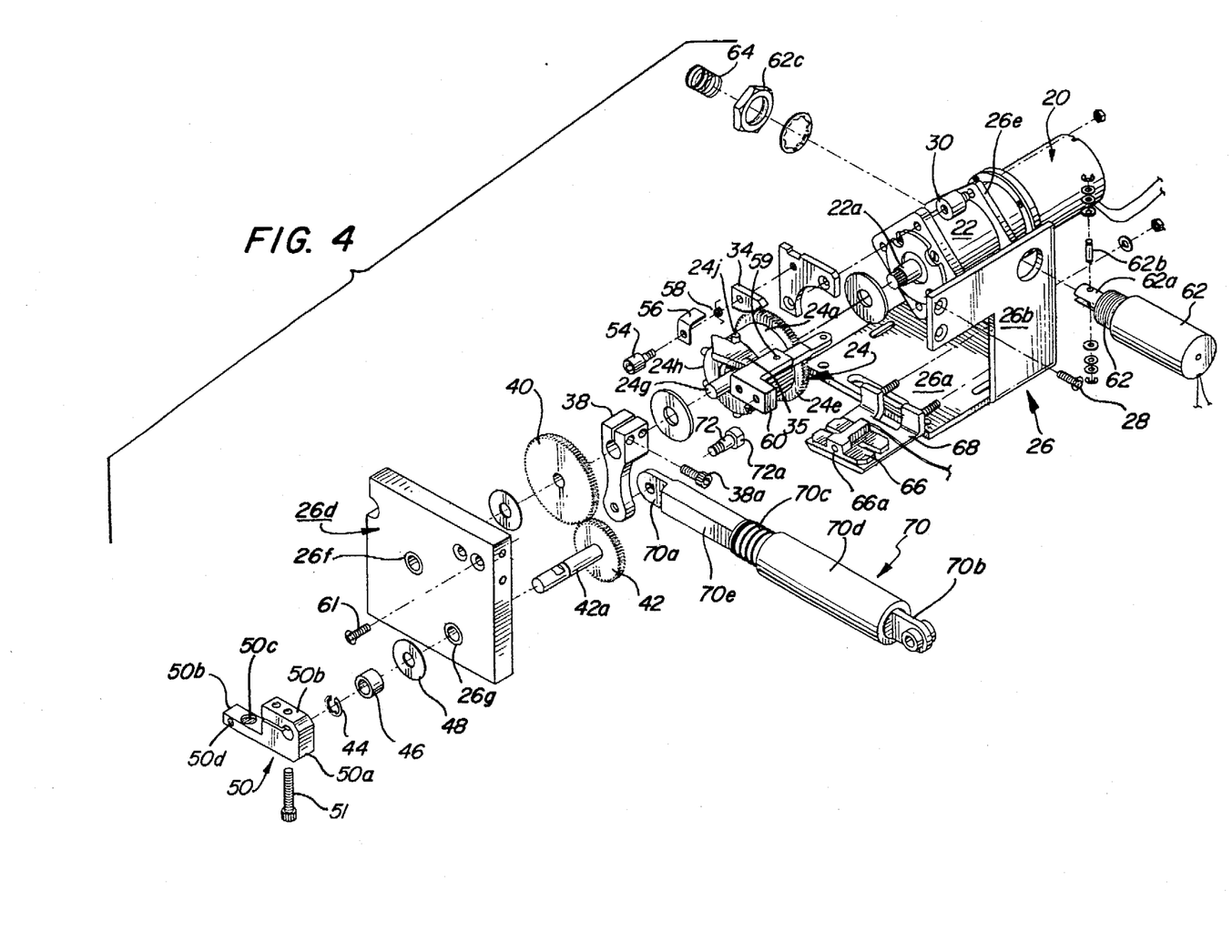
FIG. 4 is an exploded perspective view of the motor drive assembly of the apparatus of FIG. 3.

Referring now particularly to FIGS. 2-4, the apparatus 10 includes an electric motor 20, e.g., of the series d.c. type, a first planetary-gear-reduction unit 22, e.g., 400:1 connected to the motor shaft (not shown) and a second planetary-gear-reduction unit 24, e.g. 5:1, coupled to the output shaft 22a of the first gear reduction unit 22.

A motor-drive-assembly frame 26, for holding the motor, planetary gear units and related components, includes a bottom section 26a, a side section 26b and a rear section 26c integrally formed, for example, from aluminum plate. A front section 26d of the frame 26 is secured to the bottom and side sections via suitable bolts 28.

The end plate 22a of the first planetary-gear unit 22 is secured to the rear frame section 26c via spacers 30 and bolts 32. The motor 20 is suitably secured to the rear end of the planetary-gear unit 22 as shown.

Figure 11:
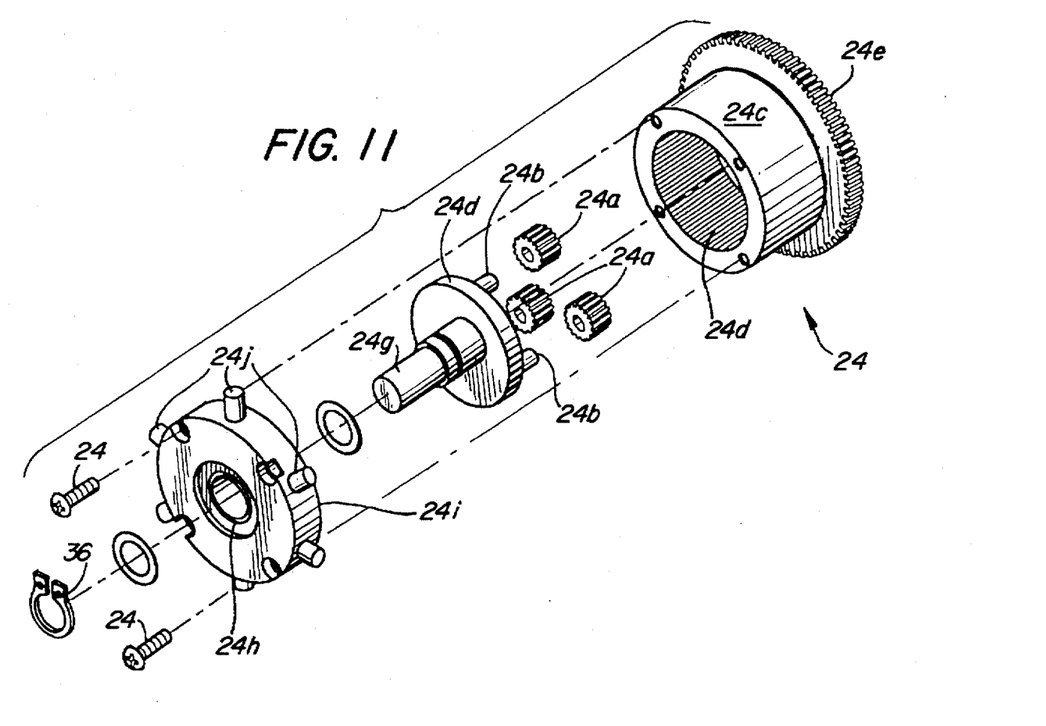
FIG. 11 is an exploded view of the gear case assembly which couples the motor to the drive assembly output shaft.
Figure 12:
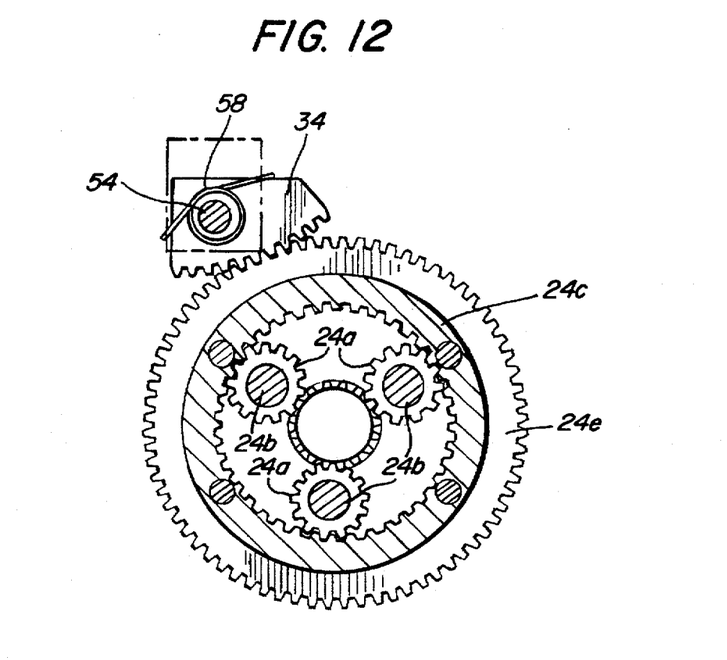
FIG. 12 is a rear elevational view of the gear case assembly of FIG. 10 including a pawl for limiting the direction of rotation of the gear case.

The second planetary-gear unit 24 includes a casing 24a and three internal spur gears 24b rotatably mounted on stub shafts 24c which are carried by an internal disc 24d. The gears 24b mesh with gear teeth on the output shaft 22a of the first planetary-gear unit 22 and also mesh with an internal gear 24e mounted on the inside of the casing of the planetary-gear unit 24. See FIGS. 11 and 12. A rear end cap 24f is mounted on the rear end of the casing 24a of the gear unit 24 and contains external gear teeth which, in cooperation with a geared pawl 34, prevents the casing from rotating in a counterclockwise direction as viewed from the front of the assembly (FIG. 12) as will be more fully explained. An output shaft 24g, for the gear unit 24, extends forwardly from the disc 24d and through a bearing 24h in a front-end-cap assembly 24i which is mounted to the front end of the casing 24a via bolts 24j to rotate therewith. The front end-cap assembly 24i includes a series of spaced radially extending pins 24k which cooperate with a motor-drive-enabling latch 35 to lock the casing 24a of the gear- unit 24 in a stationary (non-rotating) position so that the output shaft 24g will rotate (in lieu of the casing 24a) when the motor 20 is energized as will be explained. An E-type snap ring 36 secures the output shaft to the front end cap assembly 24i as is illustrated in FIG. 11.

An actuator-pivot arm 38 with a split end is clamped to the second planetary-gear-output shaft 24g via bolts 38a (FIG. 4). A spur gear 40 is keyed to the output shaft 24g for rotation therewith and the end of the shaft 24g is retained in a bearing 26f in the front section 26d of the motor assembly frame 26.

Another spur gear 42 meshes with the gear 40 and includes a monitor-drive shaft 42a which extends through bearing 26g in the front section 26d of the motor frame.

An E ring 44, spacer 46 and washer 48 retain the shaft 42a of the spur gear 42 in the front frame section 26d. A monitor-actuating arm 50 with a split end section 50a and threaded bores in the top portion thereof is clamped on the end of the shaft 42a via suitable bolts 51. The actuating arm 50 includes a flat extended distal end 50b formed with shallow blind bores 50c in the top and bottom thereof. The actuating arm 50 in cooperation with a pair of springs and a bump sensor hanger, to be described, cause the monitor to rotate with the shaft 42a while allowing limited clockwise and counterclockwise movement of the monitor relative to the shaft as will be described in more detail. The distal end 50b of the arm further includes magnets 50d embedded in the sides thereof as is shown in FIG. 4 for actuating a hall effect sensor, to be described, when the monitor is bumped, for example, by a passenger, while in the deployed position or during its travel thereto.

The anti-rotation pawl 34 is pivotally mounted to a bracket 52 via a bolt 54 angle stop 56 and bias spring 58. The bracket 52 is in turn secured to the front end plate 22b of the first planetary-gear unit 22 via bolts 32 as is shown in FIGS. 2 and 3. The spring 58 biases the geared pawl 34 into engagement with the gear 24e to prevent the second planetary-gear casing 24a from rotating in a counterclockwise direction (as viewed from the front, FIG. 12) while allowing the gear casing to rotate in a clockwise direction. It should be noted that the casing 24a rotates only in a clockwise direction.

The motor-drive-assembly-enabling latch 35 is formed in an L shape and is pivotally mounted adjacent its apex via a pin 59 to a bracket 60 which in turn is mounted to the front section 26d of the frame 26 via bolts 61. The distal end of the latch 35 has a notch 35a (FIG. 3) formed therein for selectively engaging one of the pins 24j (FIG. 4) on the front-end-plate assembly 24h of the second planetary-gear unit 24. The proximal end of the latch 35 is pivotally secured within the split end of the plunger or moveable core 62a of a solenoid 62 via a pin 62b. The solenoid housing includes a threaded end 62c which is secured to the side section 26b of the frame 26 via nut 62c. A compression spring 64 extends between the end of the housing of the solenoid 62 and the proximal end of the latch 35 to bias the distal end of the latch away from the pins 24j, thereby allowing the casing 24a instead of the output shaft 24g to rotate when the motor 20 is energized.

Figure 5:
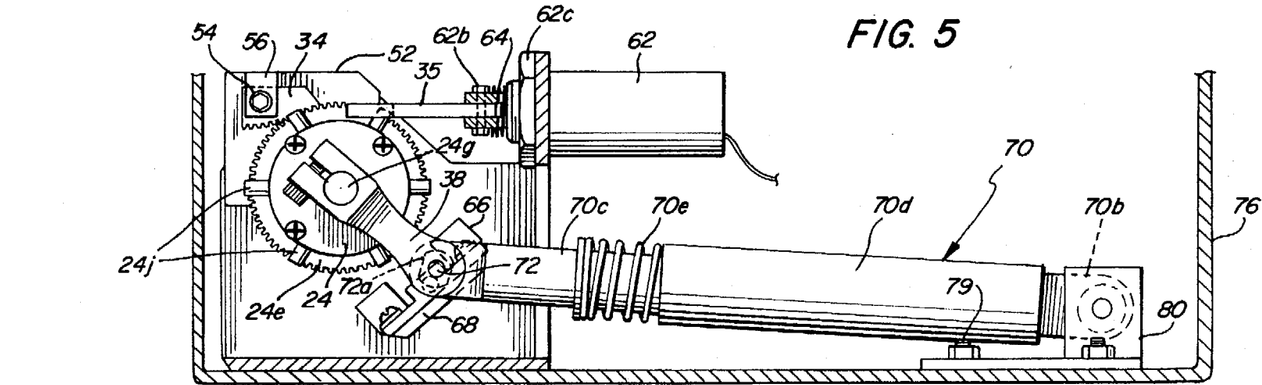
FIG. 5 is a front elevational view of the motor drive assembly taken along lines 5—5 of FIG. 2, showing the drive-assembly-output shaft in a position in which the monitor is deployed for passengers viewing.
Figure 6:
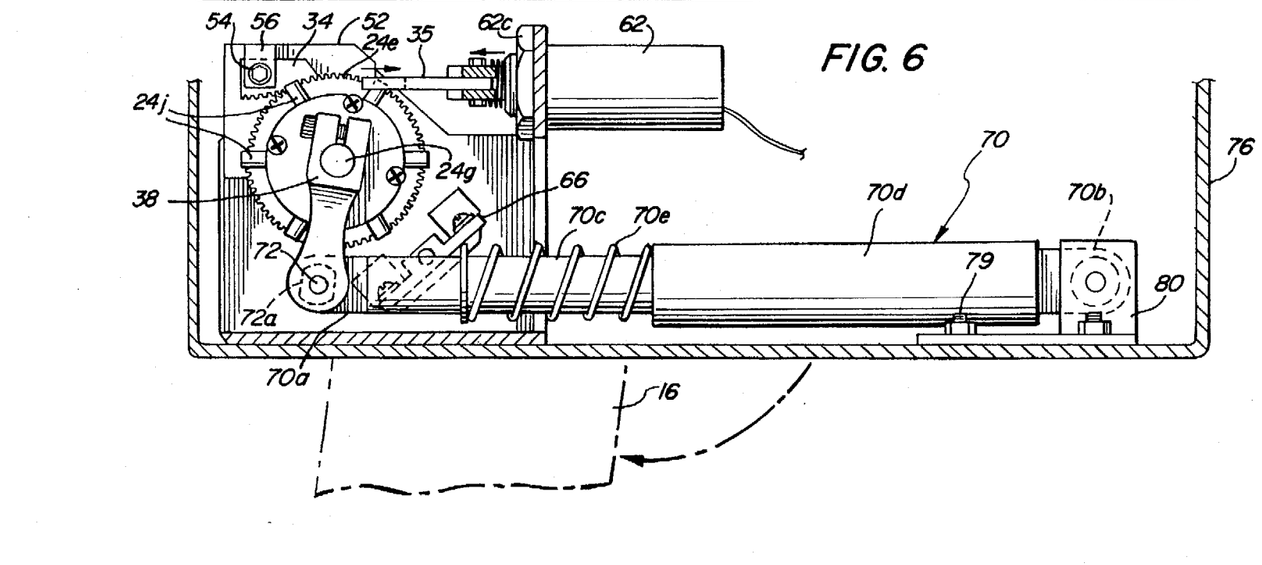
FIG. 6 is a front elevational view of the motor drive assembly of FIG. 5 showing the drive-assembly-output shaft in the position in which the monitor is stored within the housing (and overhead compartment)
Figure 7:
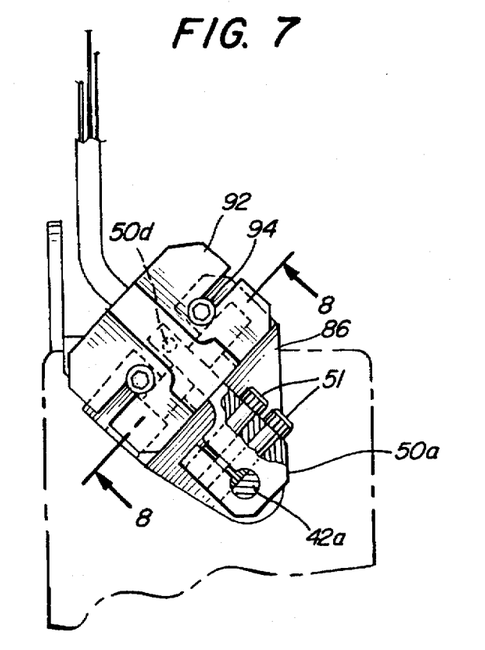
FIG. 7 is a rear elevational view of a bracket arm assembly which connects the monitor-drive shaft to the monitor and a hall effect sensor which detects movement of the monitor relative to the monitor drive shaft.

A hall-effect sensor 66, for detecting when the monitor is in the deployed position, is carried by a bracket 68 which in turn is mounted to the rear section 26c of the frame 26 to position the sensor at an angle of about 45° to the horizontal as is best illustrated in FIGS. 5 and 6.

A monitor-retraction actuator 70 is in the form of a pneumatic or hydraulic cylinder. The distal end 70c is pivotally connected to the lower end of the actuating arm 38 via a bolt 72 which has a magnet 72a imbedded in the head thereof. The proximal end 70b of the actuator 70 is mounted on the base of a housing 76 for the 8 apparatus via bolts 79 and an adjustable bracket 80. A compression spring 70c extends between the distal end of the cylindrical housing 70d and a shoulder formed on the shaft 70e for biasing the shaft outwardly to rotate the motor-drive-output shaft 24g in a clockwise direction, as viewed from the front (FIG. 6) and return the monitor to its stored position when the motor-drive-assembly is disabled via the latch 35 as will be explained in more detail. The pneumatic cylinder also acts to regulate the speed at which the monitor is retracted.

The magnet 72a actuates the hall-effect sensor 66 when the output shaft 24g has rotated the monitor to its deployed position as is illustrated in FIG. 6. The hall-effect sensor, when actuated, provides a signal to a central control unit or processor 78 shown in the block diagram of FIG. 13. A speaker 81 is also mounted in the housing 76 as is illustrated in FIG. 2.

Figures 8, 9, 10:
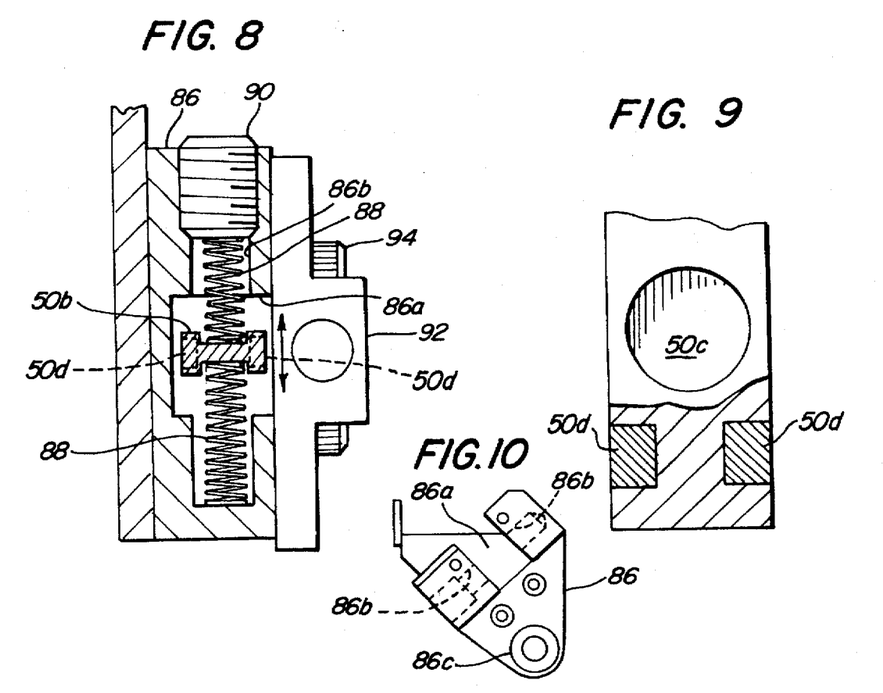
FIG. 8 is a cross-sectional view along lines 8—8 of bracket-arm assembly and hall effect sensor of FIG. 7.
FIG. 9 is a top plan view, partially in section, of the end of the bracket arm of FIG. 7.
FIG. 10 is a side elevational view of a bump sensor hanger for connecting the monitor to the monitor drive shaft.

A monitor-carrying bracket 82 (FIG. 3) is pivotally mounted at one end 82a to the housing 76 via an L-shaped clip 84, threaded pin 84a, bushing 84b and washer 84c. The other end 82b of the monitor bracket is fitted over the end of the shaft 42a via another bushing 84d so that the bracket is free to rotate relative to the shaft 42a. A bump-sensor hanger 86 (FIG. 10) is mounted on the end 82b of the monitor bracket. The hanger 86 includes a laterally extending slot 86a for receiving the end 50b of the actuating arm 50. The hanger also includes a blind bore 86b extending from the top thereof which is bisected by the slot 86a. A pair of springs 88 are positioned within the blind bore 86b on either side of the end 50b of the actuating arm 50 with a set screw 90 threaded in the top of the bore to maintain the springs in place as is shown in FIG. 8. The hanger 86 includes a bore which receives the bushing 84d (FIGS. 3 and 10). The monitor is secured to the bracket 82 by suitable bolts or rivets (not shown) for rotation therewith.

A hall-effect sensor 92 is mounted to the hanger 86 via bolts 94 for detecting relative movement between the end of the actuating arm 50 and the hanger/monitor.

Figure 13:
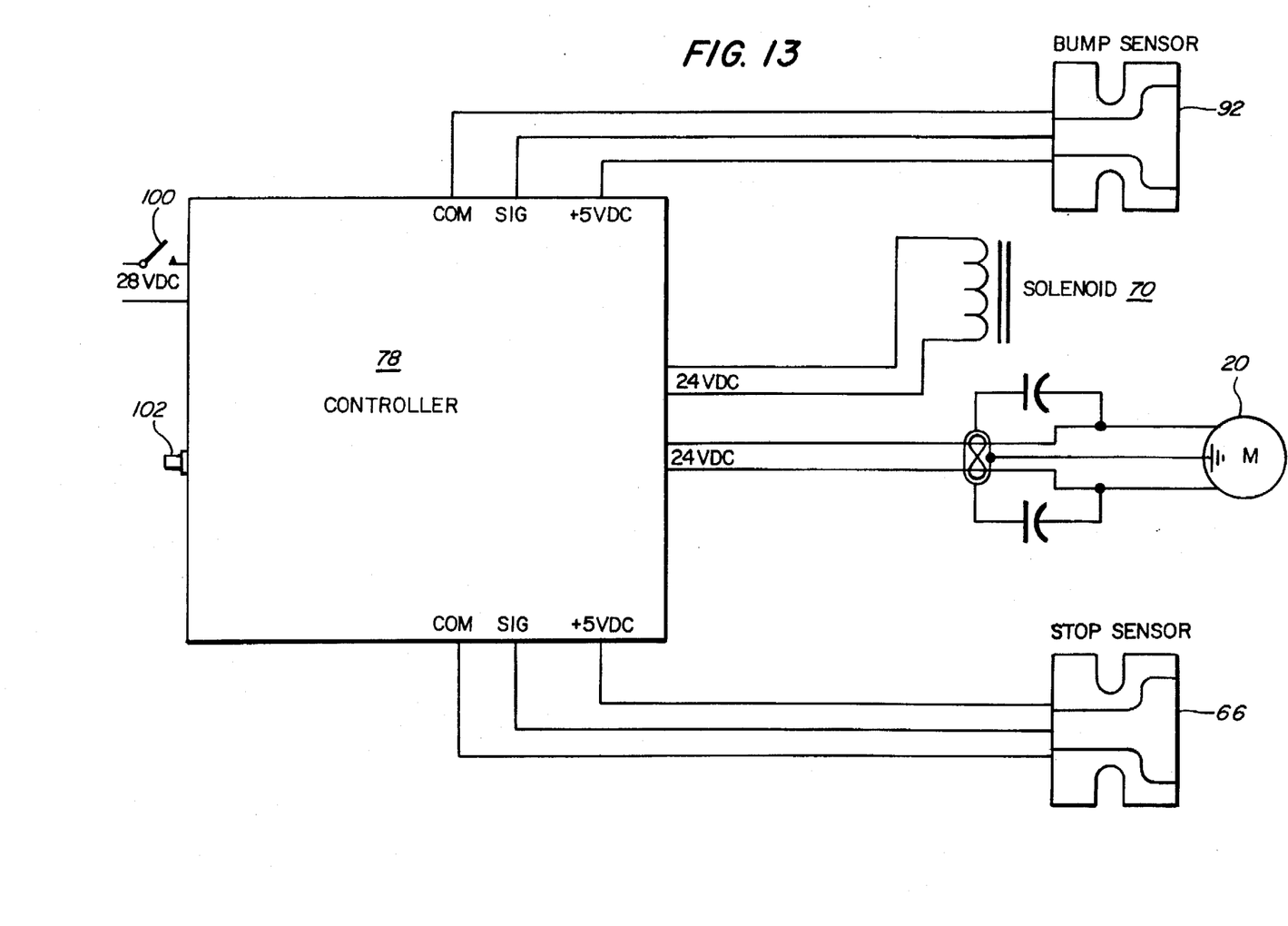
FIG. 13 is a block diagram of a controller for controlling the operation of the apparatus.

Referring now to FIG. 13, the controller or processor 78, in response to the actuation of a master switch 100 which supplies power to the controller 78 which in turn supplies current to the motor 20 and solenoid 62 to initiate the deployment of the monitor. Signals from the stop and bump hall effect sensors 66 and 92 are used to control the motor and the motor drive assembly enabling latch as will be explained.

In the absence of current to the motor 20 (and the solenoid 62) the monitor 16 is in its stored position and retained in that position by the action of the spring 70c in rotating the actuating arm 38 to the limit of its counterclockwise travel as is illustrated in FIG. 6. In the stored position (without power to the solenoid 62) the spring 64 rotates the latch 35 in a counterclockwise direction, as viewed from the top (FIG. 2) and prevents the latch from engaging the pins 24j on the rear-end-cap assembly 24i of the second planetary gear unit.

To deploy the monitor, an aircraft flight attendant closes the master switch 100 to supply power to the motor 20 and the solenoid 62. Actuation of the solenoid 62 rotates the motor-drive-assembly-enabling latch 35 into engagement with one of the pins 24j on the front end cap assembly 24i of the second planetary-gear unit 24. This action prevents the casing 24a from rotating, thereby transferring the rotary motion of the shaft 24a of the first planetary-gear unit to the drive-assembly-output shaft 24g. The output shaft 24g rotates in a clockwise direction until the bolt 72a (and the embedded magnet) reaches the crystal of the hall-effect sensor 66. At that time the sensor 66 transmits a signal to the controller 78 which in response thereto deenergizes the motor 20. The gear pawl 34 through its engagement with the gear 24e on the rear end cap 24f prevents the second planetary gear casing 24a from rotating counterclockwise (FIG. 5), thereby holding the output shaft in the deployed position. During the deployment, the motor-drive-assembly-output shaft 24g rotates the monitor 16 to its deployed position via gears 40, 42, shaft 42a, actuating arm 50 and bump sensor hanger 86.

Movement of the monitor 16 relative to the actuating arm 50 as a result of a passenger bumping the monitor in its deployed position or during its travel to the deployed position, will cause the distal end of the actuating arm 50 to compress one of the springs 88 and displace the magnet 50d, embedded in the side thereof, from the crystal in the crystal detector of the hall sensor 92. When the monitor is moved through a predetermined angle (e.g., 2°–10°) or arc relative to the actuating arm 50 the signal transmitted to the controller 78 by the bump sensor 92 drops to a level which causes the controller to deenergize the solenoid 70. This action allows the spring 64 to disengage the latch 35 from the pin(s) 24j thereby allowing the spring 70c of the monitor-retraction actuator to return the monitor to its stored position.

The controller may be programmed to reenergize the solenoid 70 one or more times after a set time delay following the retraction of the bumped monitor to thereby redeploy the monitor to its viewing position. After a preset number of attempts (e.g., 3) to redeploy the monitor, the controller may be programmed to remove power to the motor and solenoid. The controller may be programmed to again apply power to the solenoid and motor by turning the master switch off and then on or in response to the actuation of a reset button 102.

The monitor will be automatically retracted to its stored position when the motor-drive-enabling latch 35 is disabled by the de-energization of the solenoid 62 as a result of (a) an aircraft power failure, (b) the opening of the master switch 100 by aircraft personnel or as a result of a drop in cabin pressure or (c) the monitor being bumped by a passenger. A pressure responsive element (not shown) is arranged to open the master switch 100 when the cabin pressure drops below a preset level.

There has thus been described a novel video monitor or screen deployment/retraction apparatus which is compact (e.g., requiring only three inches in depth and seven inches in length for a five inch screen), relatively simple and inexpensive to manufacture. The apparatus satisfies the FAA requirements of:

1) deployment of the monitor only upon the actuation of a central or main switch;

2) automatic retraction of the monitor upon an aircraft power failure or drop in cabin pressure; and 3) automatic retraction of the monitor when bumped by a passenger or aircraft personnel.

While the apparatus has been designed primarily for small monitors and narrow-bodied commercial aircraft, it may be used for larger monitors and larger aircraft.

Various modifications of the described apparatus will become apparent to those skilled in the art without involving any departure from the spirit and scope of my invention as defined in the appended claims.

What is claimed is:

1. In a video monitor deployment and retraction apparatus for use in an aircraft overhead storage compartment, the combination comprising:

a) a monitor frame adapted to be mounted in the compartment;

b) a monitor-drive shaft rotatably mounted in the frame;

c) a monitor movable between a stored position and a deployed position;

d) a first coupling mechanism for connecting the monitor to the monitor-drive shaft, when enabled, to cause the monitor to rotate with the shaft while allowing the monitor to move through a predetermined angle in either direction relative to the shaft in response to an external force applied to the monitor;

e) an electric motor;

f) a second coupling mechanism for coupling the motor to the monitor-drive shaft, when enabled, whereby the motor, when energized, rotates the monitor-drive shaft and monitor to the deployed position;

g) a first position sensor for sensing when the monitor is in the deployed position;

h) means responsive to the first position sensor for deenergizing the motor;

i) a spring coupled to the monitor-drive shaft for biasing the shaft in a direction to return the monitor to the stored position when the second coupling mechanism is disabled;

j) a second position sensor comprising a bump sensor for sensing when the monitor has moved through said predetermined angle relative to the monitor-drive shaft; and k) means responsive to the bump sensor for disabling the second coupling mechanism.

2. The invention of claim 1 wherein the second coupling mechanism includes a solenoid, the second coupling mechanism being enabled when the solenoid is energized.

3. The invention of claim 2 further including a controller for reenergizing the motor and the solenoid a preset time after the monitor has been returned to its stored position as a result of the monitor being moved through said predetermined angle.

4. The invention of claim 2 wherein the first coupling mechanism includes at least one spring interposed between the monitor-drive shaft and the monitor.

5. The invention of claim 4 wherein each of the first and second position sensors include a hall-effect transducer.

6. The invention of claim 4 wherein the second coupling mechanism further includes a first planetary-gear unit having a casing and arranged to connect the motor to the monitor-drive shaft when the casing is prevented from turning.

7. The invention of claim 6 wherein the second coupling mechanism further includes a latch which in response to the energization of the solenoid selectively engages the casing to prevent rotation thereof.

8. The invention of claim 7 wherein the second coupling mechanism further includes a spring which biases the latch in a direction to disengage the casing of the first planetary-gear unit.

9. The invention of claim 7 further including a second planetary gear unit interposed between the motor and the first planetary-gear unit.

10. In a video screen deployment and retraction apparatus for use in an aircraft overhead compartment the combination which comprises:

a) a housing adapted to be mounted in the compartment;

b) an electric motor mounted in the housing;

c) a video screen rotatably mounted in the housing between a stored position and a deployed position;

d) a screen-deployment shaft, the screen being coupled to the deployment shaft for rotation therewith while allowing limited rotational movement between the screen and the shaft;

e) a screen-bump sensor which provides a bumped screen signal when the screen has moved through a predetermined angle in either direction relative to the deployment shaft; and f) a screen-deployment-shaft-coupling mechanism which selectively connects the motor to the deployment shaft whereby the motor when connected to the deployment shaft can rotate the screen to its deployed position, the coupling mechanism being responsive to the bumped screen signal to disconnect the motor from the deployment shaft.

11. The invention of claim 10 wherein the screen-deployment-shaft-coupling mechanism includes a planetary-gear unit having a casing and arranged to connect the motor to the deployment shaft when the casing is prevented from rotating.

12. The invention of claim 11 wherein the screen-deployment-shaft-coupling mechanism further includes a latch which selectively engages the casing to restrain the rotation thereof.

13. The invention of claim 12 wherein the screen-deployment-shaft-coupling mechanism further includes a solenoid for moving the latch into engagement with the casing, when energized, and a spring to disengage the latch from the casing of the planetary-gear unit when the solenoid is deenergized.

14. The invention of claim 13 further including a spring to retract the screen to its stored position when the latch is disengaged from the casing of the planetary-gear unit.

15. The invention of claim 14 wherein the solenoid is deenergized in response to the bumped screen signal.

16. The invention of claim 15 further including a second planetary-gear unit interposed between the motor and the gear unit of the screen-deployment-shaft-coupling mechanism.

17. The invention of claim 15 further including a controller for reenergizing the motor and the solenoid a preset time after the screen has been returned to its stored position as a result of the screen being moved through said predetermined angle.

* * * * *

UNITED STATES PATENT AND TRADEMARK OFFICE
CERTIFICATE OF CORRECTION

PATENT NO. : 5,743,487
DATED : April 28, 1998
INVENTOR(S) : Mark X. Rice

It is certified that error appears in the above-indentified patent and that said Letters Patent is hereby corrected as shown below:

In the Abstract, line 11, "stores" should read as --stored--.

Signed and Sealed this

Twenty-eighth Day of July, 1998

Attest:

BRUCE LEHMAN

*Attesting Officer*   *Commissioner of Patents and Trademarks*